United States Patent
Dern et al.

(10) Patent No.: US 8,191,046 B2
(45) Date of Patent: May 29, 2012

(54) CHECKING TRANSACTIONAL MEMORY IMPLEMENTATIONS

(75) Inventors: Christopher Dern, Kirkland, WA (US); Raghuveer Simha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 12/246,231

(22) Filed: Oct. 6, 2008

(65) Prior Publication Data

US 2010/0088702 A1 Apr. 8, 2010

(51) Int. Cl.
*G06F 9/44* (2006.01)
(52) U.S. Cl. ......................... 717/124; 717/126
(58) Field of Classification Search .................. None
See application file for complete search history.

(56) References Cited

U.S. PATENT DOCUMENTS

| | | | |
|---|---|---|---|
| 6,067,415 A | 5/2000 | Uchihira | |
| 6,851,075 B2 | 2/2005 | Ur et al. | |
| 2004/0230961 A1 | 11/2004 | Biberstein et al. | |
| 2005/0086648 A1 | 4/2005 | Andrews et al. | |
| 2006/0130010 A1 | 6/2006 | Rehof et al. | |
| 2006/0161897 A1 | 7/2006 | Biberstein et al. | |
| 2008/0288834 A1* | 11/2008 | Manovit et al. | 714/718 |

OTHER PUBLICATIONS

Guerraoui-Rachid, Henzinger-Thomas-A, Jobstmann-Barbara, Singh-Vasu. "Model checking transactional memories" SIGPLAN Notices, {SIGPLAN-Not-USA}, Jun. 2008, vol. 43, No. 6, p. 372-82.*
Musuvathi, et al., "Iterative Context Bounding for Systematic Testing of Multithreaded Programs", ACM SIGPLAN Notices. vol. 42, Issue 6 (Jun. 2007), Proceedings of the 2007 PLDI conference. pp. 446-455.
Qadeer, et al., "Context-Bounded Model Checking of Concurrent Software", Proceedings of the 11th International Conference on Tools and Algorithms for the Construction and Analysis of Systems, 2005. pp. 93-107.
Manovit, et al., "Testing Implementations of Transactional Memory", PACT'06, Sep. 16-20, 2006, Seattle, Washington, USA. 9 Pages.
Rehof, "ZING Systematic State Space Exploration of Concurrent Software", 2005. PPT File available at webpage: http://www.cs.ioc.ee/yik/schools/sum2005/JRehof/Lecture2.ppt.
Farchi, et al., "Concurrent Bug Patterns and How to Test Them", IEEE 2003. 7 Pages.
Saraswat, et al., "A Theory of Memory Models (Extended Abstract)", ACM 2007. 12 Pages.
Herlihy, et al., "Transactional Memory: Architectural Support for Lock-Free Data Structures", IEEE 1993. 12 Pages.
Abadi, et al., "Principles and Constructs for STM: Automatic Defense against the Living Dead", research.microsoft.com/research/sv/ame/AMESemantics-POPLDraft.pdf, Jul. 15, 2007. 12 Pages.
Dern, et al., "A Practical and Systematic Approach to Testing Transactional Memory", submitted on or about Apr. 9, 2008 for SPIN '08 Conference. 12 Pages.
Menon, et al., "Single Global Lock Semantics in a Weakly Atomic STM", Transact '08, 2008. 12 Pages.

* cited by examiner

*Primary Examiner* — Jacob A Petranek
(74) *Attorney, Agent, or Firm* — Ogilvie Law Firm (57) ABSTRACT

A transactional memory implementation is tested using an automatically generated test program and a locking memory model implementation which defines atomicity semantics. Schedules of the test program specify different interleavings of read operations and write operations of the test program threads. Executing the schedules under the locking memory model implementation provides legal final states of the shared variable(s). Executing the schedules under the transactional memory implementation produces candidate final states of the shared variable(s). If the candidate final states are also legal final states, then the transactional memory implementation passes the test.

20 Claims, 3 Drawing Sheets

CHECKING TRANSACTIONAL MEMORY IMPLEMENTATIONS

BACKGROUND

Sometimes a computational problem can be divided into pieces in a way that allows a system to work on more than one piece at a time. For example, concurrent computing simultaneously carries out multiple computing tasks, such as multiple threads or multiple processes. Similarly, parallel computing systems carry out multiple instructions simultaneously. Parallel computing may be viewed as an example of concurrent computing, and the distinction between them is not critical here.

Various tools and techniques are used to coordinate the pieces of a divided computational problem. For example, locks are sometimes used to control access to shared resources, such as variables which are used by more than one thread of a program. Locks may also be used to provide synchronization between threads.

In place of locks, or in addition to them, transactional memory may be used to control access to shared memory. Transactional memory supports transactions. In some transactional memory systems, code in a transaction executes a series of reads and writes to shared memory which appear, from outside the transaction, to happen atomically. That is, the intermediate states of the shared memory are not visible to other transactions. Either the entire result of all shared variable reads and writes in a transaction are visible outside the transaction (after the transaction succeeded), or else none of that result is visible (the transaction failed).

SUMMARY

A transactional memory implementation is checked using a test program and a locking memory model implementation which defines atomicity semantics. The transactional memory implementation being checked may be designed to have strong atomicity or weak atomicity, for example, and it may be checked for adherence to either semantics by using a locking memory model implementation having the desired semantics. In some embodiments, the test program has at least two threads, has at least one transaction, and has at least one shared variable which is concurrently accessed by at least two threads and which is accessed both inside a particular transaction and outside that particular transaction. Schedules of the test program specify different interleavings of read operations and write operations of the test program threads. The test program and the schedules may be automatically generated. Executing the schedules under the locking memory model implementation provides a set of legal final states of the shared variable(s). Executing the schedules under the transactional memory implementation being tested produces a set of candidate final states of the shared variable(s). If the candidate final states are also in the set of legal final states, then the transactional memory implementation passes the test; if not, it fails the test.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

With the increased use of concurrent programming, transactional memory is gaining traction as a means of mitigating shared memory synchronization problems. Transactional memory offers an implicit fine-grained lock-free alternative to explicit lock-based synchronization, thereby providing programmers with an easy-to-use programming model. Transactional memory implementations may allow programmers to express synchronization and to manage failures with greater reliability, scalability and ease of use than lock-based alternatives.

Transactional memory is a concurrency control mechanism that controls access to shared memory in concurrent programs. Transactional memory implementations can build on the fundamentals of database transactions, and transactional memory may be implemented without lock-based synchronization.

Transactional memory systems guarantee to a programmer the properties of atomicity, consistency and isolation. Atomicity refers to the ability of the transactional memory system to make it appear that either all the operations in a transaction were executed, or none were. A transactional memory system may provide strong atomicity or weak atomicity, for example. Strong atomicity guarantees atomicity between transactions and non-transactional code, while weak atomicity guarantees atomicity among only transactions. Consistency refers to the fact that transactions appear to operate against a consistent snapshot of memory, where no other thread is writing to any of the shared memory locations. Isolation refers to the fact that the effect of memory writes made by a transaction are not visible to other transactions until the writes are committed.

Testing concurrent software is difficult because of its non-deterministic behavior. Testing transactional memory compounds this difficulty, due to the optimistic nature of transactional memory and semantic differences between implementations. One approach to testing transactional memory is to simply run a test program many times and verify its correctness for every resulting schedule. Due to the inherent nondeterminism in the scheduling of each run, this approach does not guarantee that all concurrency bugs in the program will be caught.

Transactional memory systems are complex, with multiple design choices and semantic differences among implementations. Ensuring the correctness of a transactional memory system is a complex problem. Unlike traditional computing algorithms such as sorting which are generally tested by using data inputs and verifying program outputs against known output values, testing a transactional memory system may involve running test programs on the system and verifying that the atomicity, consistency, and isolation properties are satisfied after the program is executed.

Transactional memory may be implemented in different ways with different results, particularly for variables which are accessed both within a transaction and outside a transaction. Different transactional memory implementations may be designed to follow different semantic models. For instance, the semantics of atomicity may differ from one transactional memory implementation to another. Transactional memory may also be implemented in various forms, with special-purpose hardware, in software on general-purpose hardware, or with a combination of software and special-purpose hardware, for example.

Some embodiments described herein provide an approach to testing transactional memory which includes systematic shared variable state space exploration and correctness verification using a test "oracle"; the oracle provides a way to generate semantic requirements to be met. Accordingly, the testing of transactional memory implementations may become more deterministic and less reliant on sheer volume of execution to catch defects. To ensure coverage of the state space, in some embodiments test programs are randomly generated but must also conform to a specified pattern with respect to shared variable access and other features. A memory model based test may help demonstrate that a transactional memory implementation is correct for a specified memory model. In some embodiments, iterative context-bounding is used to systematically explore the state space for a given test program. Some embodiments use a "four statement, four variable" test program pattern, which provides a small input space that nonetheless allows testing with data races, publication, and privatization.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

As used herein, "testing" an implementation is one way of "checking" the implementation. Checking is broader than testing, in that testing implies failure or success to meet a set of requirement(s), whereas checking may include investigating an implementation's behavior without necessarily determining success or failure to meet specific requirement(s).

Throughout this document, use of the optional plural "(s)" means that one or more of the indicated feature is present. For example, "state(s)" means "one or more states" or equivalently "at least one state".

"Code" means processor instructions, data (which includes data structures), or both instructions and data.

Whenever reference is made to data or instructions, it is understood that these items configure a computer-readable memory, as opposed to simply existing on paper, in a person's mind, or as a transitory signal on a wire, for example.

Operating Environments

Figure 1:
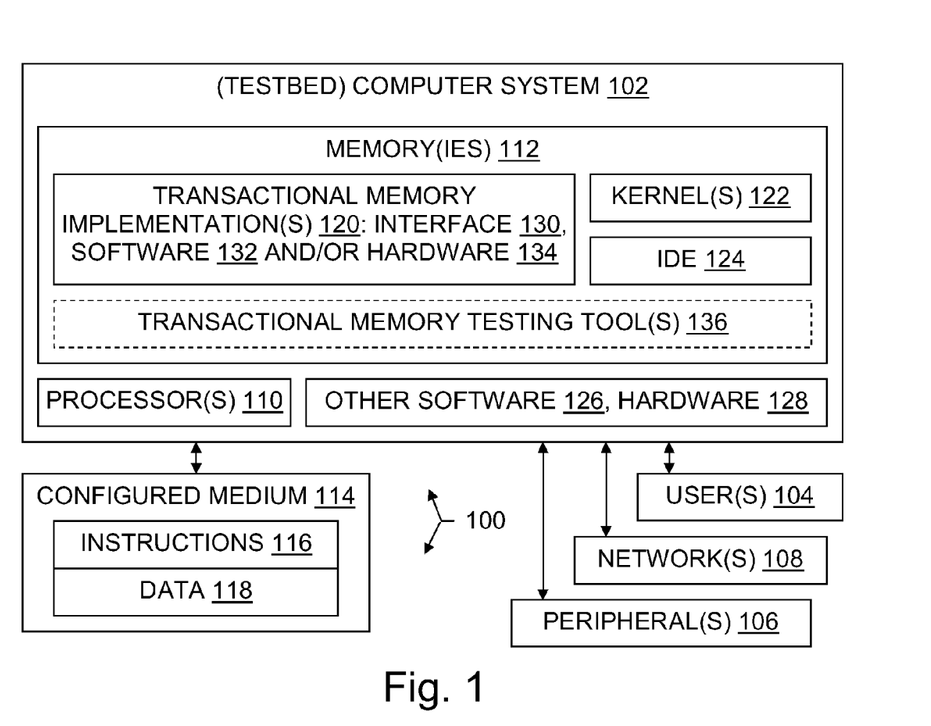
FIG. 1 is a block diagram illustrating a computer system having a transactional memory implementation to be checked and other items in an operating environment, and also illustrating configured storage medium embodiments.

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays, keyboards, and other peripherals 106. System administrators, developers, engineers, and end-users are each a particular type of user 104. Automated agents may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. Memories 112 may be of different physical types. Transactional memory implementations 120, kernel(s) 122, and other items shown in the figures may reside partially or entirely within one or more memories 112, thereby configuring those memories.

A given operating environment 100 may include an Integrated Development Environment (IDE) 124 which provides a developer with a set of coordinated software development tools. In particular, some of the suitable operating environments for some embodiments include or help create a Microsoft® Visual Studio® development environment (marks of Microsoft Corporation) configured to support source code development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development that use transactional memory.

Specific programs and other software 126 and other hardware 128 than that already enumerated may also be present. In particular, the illustrated operating environment 100 includes an interface 130 to one or more transactional memory implementations 120, such as an API or a diagnostic interface 130. Although the transactional memory implementations 120 are depicted in memory 112 in FIG. 1, a given transactional memory implementation 120 may include software 132 and/or hardware 134. The approaches described herein for checking transactional memory implementations 120 may be used with software transactional memory implementations 120, with special-purpose hardware transactional memory implementations 120, and with transactional memory implementations 120 that include both software and special-purpose hardware.

As indicated in FIG. 1, the operating environment 100 may include transactional memory testing tools 136, namely, programs, libraries, data sets, memory models, execution schedules, test program patterns, hardware adaptors, APIs, and/or other tools for checking the behavior of one or more transactional memory implementations. If one or more such tools 136 reside on the computer system 102, then the computer system 102 serves not only as a test subject but also as a testbed for transactional memory implementation tests. Some or all of the tools 136 may also reside on another computer system, not shown in FIG. 1, which communicates directly or indirectly with the test subject computer system 102 through a network 108 link, direct memory access, a signal bus, removable medium 114, and/or other data/control signal communication mechanism(s).

Systems

Figure 2:
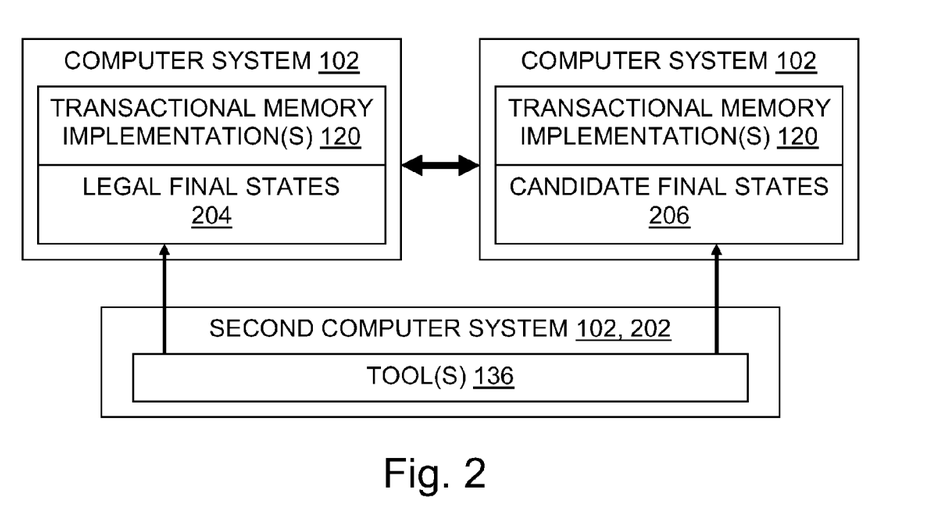
FIG. 2 is a block diagram illustrating a configuration in which a transactional memory implementation resides on one computer system and testing tools reside at least in part on a second computer system.

FIG. 2 illustrates a configuration in which a test subject computer system 102 includes one or more transactional memory implementations 120 to be tested. A second computer system 202 runs testing tools 136 that provide input to guide the tests run on the test subject computer system 102. The second computer system 202 is also designated as a computer system 102, although it is not a test subject, because the second computer system 202 has memory(ies) 112, processor(s) 110, peripheral(s) 106, user(s) 104, and so on.

FIG. 2 shows two blocks for the test subject computer system 102, side by side. One block contains one or more legal final states 204 of concurrently accessed variable(s), and the other block contains one or more candidate final states 206 of concurrently accessed variable(s). As explained further below, the legal final states 204 are obtained by executing test programs under a selected locking memory model, and the candidate final states 206 are produced by running the test programs under the transactional memory implementation(s) 120 being tested. To the extent that candidate final states 206 fall outside the legal final states 204, the transactional memory implementation 120 does not meet the selected locking memory model's semantic requirements.

The test subject computer system 102 blocks are shown side by side near the second computer system 202 in FIG. 2 to help indicate that the legal final states 204 and the candidate final states 206 can result from test program executions that occur in parallel. However, the legal final states 204 and the candidate final states 206 can also be created in sequence, and they may be created on one or more machines. In particular, in one embodiment the candidate final states 206 are produced on the test subject computer system 102 but the legal final states 204 are produced on the second computer system 202; the states 204, 206 are then compared on one or the other (or on a third) system to determine whether any candidate final states are illegal. In another embodiment, both sets of states 204, 206 are provided by executing test programs on the test subject computer system 102.

Figure 3:
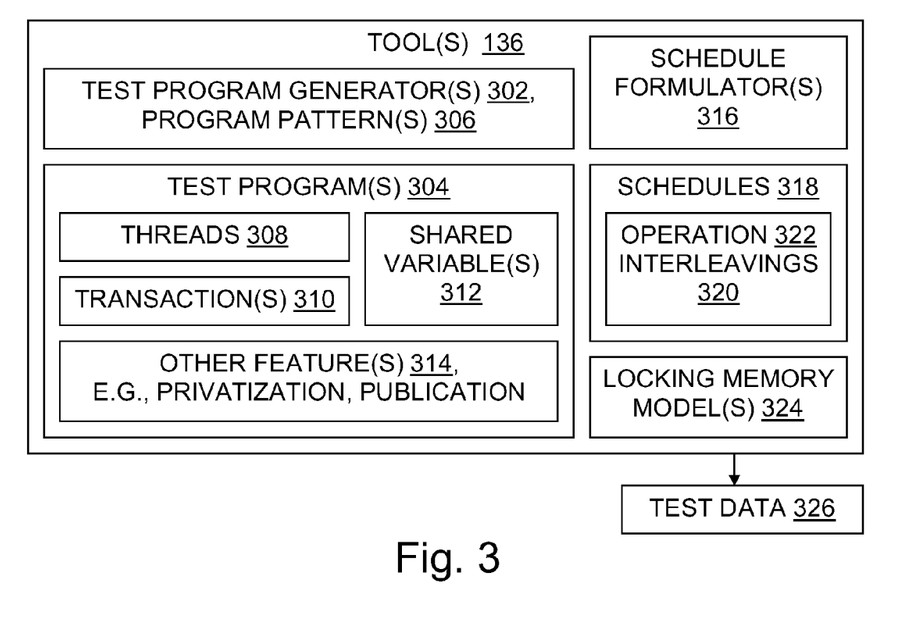
FIG. 3 is a block diagram further illustrating tools for checking a transactional memory implementation.

FIG. 3 illustrates some tools 136 for checking transactional memory implementation(s) 120. A test program generator 302 generates test programs 304 which conform to a pattern 306. Test programs that do not conform to a desired pattern 306 may be provided by the test program generator, but are manually and/or automatically discarded. The pattern 306 may specify test program features such as the number of threads 308, the number and placement of transactions 310, the number and placement of shared variables 312 that are accessed by threads, and other features 314 such as data races, privatization, and publication.

A schedule formulator 316 formulates execution schedules 318 for the test program(s) 304. A schedule 318 specifies an interleaving 320 of read and/or write operations 322 performed by a test program.

A locking memory model 324 specifies transactional memory requirements such as atomicity, consistency, and/or isolation. Running test programs under a locking memory model produces test data 326 in the form of legal final states 204, and running test programs under a transactional memory implementation 120 produces test data 326 in the form of candidate final states 206. States 204, 206 may be considered tools 136, as well as being data produced by tools 136.

FIG. 3 provides an overview of the tools 136. A given embodiment that includes a tool(s) 136 does not necessarily include all of the tools 136 shown in FIG. 3.

Figure 4:
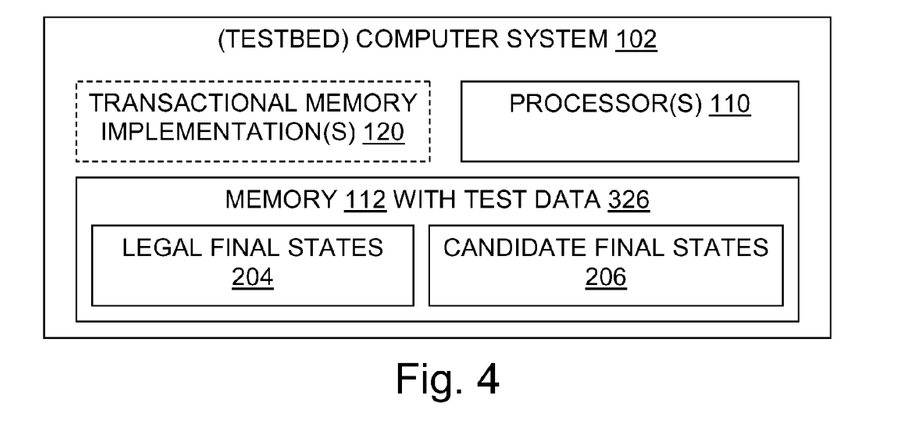
FIG. 4 is a block diagram further illustrating a computer system for checking a transactional memory implementation.

FIG. 4 illustrates a configuration in which legal final states 204 and candidate final states 206 each reside on a computer system 102. That computer system 102 also serves as a test-bed if it includes one or more transactional memory implementations 120 being checked.

Referring now to FIGS. 1 through 4, some embodiments provide a computer system 102 having a memory 112 which contains transactional memory implementation test data 326 generated by a particular method. Processor(s) 110 of the system 102 work in operable communication with the memory 112 to facilitate the method, e.g., by executing test program(s) under various schedules 318.

In one embodiment, the method includes obtaining a set of shared variable legal final states 204 by executing schedules 318 of a test program 304 under a locking memory model 324 implementation. In some embodiments, the test program 304 has at least two threads 308, at least one transaction 310, and at least one shared variable 312 which is accessed by at least two threads and which is accessed both inside a particular transaction and outside that particular transaction. The method also includes producing a set of shared variable candidate final states 206 by executing schedules 318 of the test program 304 under a transactional memory implementation 120. The same schedules may be used to provide the legal final states 204 and the candidate final states 206 in some cases, while in other cases the schedule sets used will merely overlap. For instance, it may become clear after running a portion of the schedules that some candidate final states are illegal, leading a user to decide against running the rest of the schedules with the current version of the transactional memory implementation. Some embodiments repeat the legal final state obtaining step and the candidate final state producing step for multiple test programs 304. The test data 326 generated may include legal final states 204, candidate final states 206, and/or other data generated under the method. In some embodiments, the method includes automatically comparing the shared variable candidate final states 206 to the shared variable legal final states 204, and the test data 326 includes results of such a comparison.

In some embodiments, the method includes automatically generating the test programs 304 in conformance with a pattern 306. The test program generator 302 may generate only test programs that conform to the pattern, or it may generate additional test programs and discard those which do not conform. The pattern 306 may specify test program features to enforce an acceptable range for the number of shared variables 312 in the test program, an acceptable range for the number of threads 308 in the test program, an acceptable range for the number of threads that read a shared variable in the test program, an acceptable range for the number of threads that write a shared variable in the test program, an acceptable range for the number of statements in a thread, an acceptable range for the number of transactions 310 in a thread, and/or an acceptable placement for a transaction in the test program, for example. The test program may be designed to include, or may be selected because it includes, other features 314 such as a data race, publication, and/or privatization.

In some embodiments, the system executes at least one schedule 318 for each of the possible test programs that conform with a particular pattern 306. In some embodiments, the system executes all possible schedules 318 for at least one test program. In some embodiments, only some of the possible test programs that conform to the pattern are used in testing; in some embodiments, only some of the possible schedules for a given test program are used in testing. Schedules 318 may be automatically formulated by the schedule formulator 316, and/or manually generated/tweaked by a developer.

A given configuration may perform testing with legal final states 204 obtained by executing schedules of the test program(s) under an implementation of one or more locking memory models 324. Some examples of locking memory models 324 include strongly atomic in-place update, single global lock atomicity, asymmetric flow ordering, asymmetric lock atomicity, disjoint lock atomicity, and encounter-time lock atomicity. A given embodiment may also use other locking memory models 324.

In some embodiments, peripherals 106 such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Methods

Figure 5:
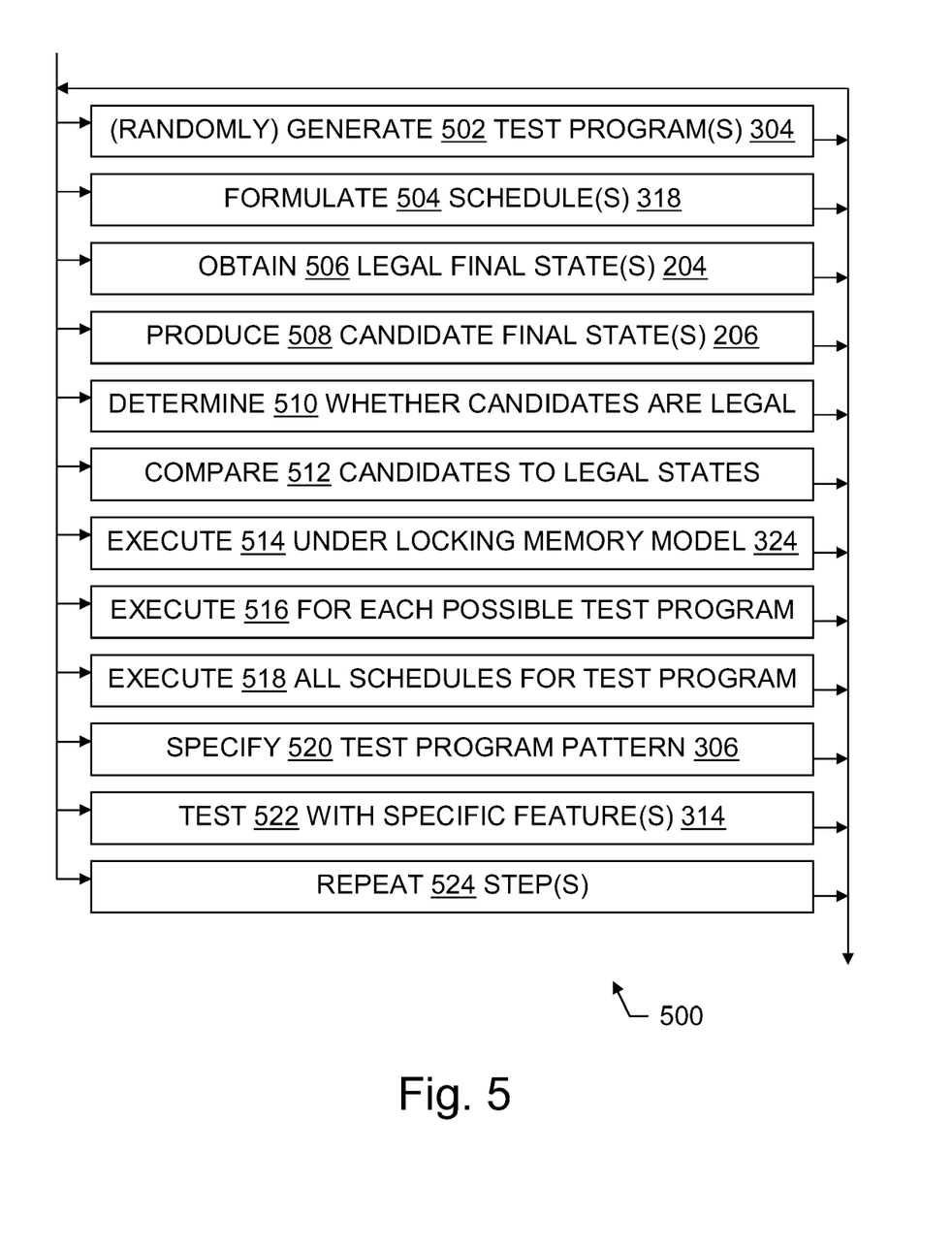
FIG. 5 is a flow chart illustrating steps of some method and configured storage medium embodiments.

FIG. 5 illustrates some method embodiments in a flowchart 500. Methods shown in the figures may be performed in some embodiments automatically, e.g., by testing tools 136 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 5. Steps may be performed serially, in a partially overlapping manner, or fully in parallel. The order in which flowchart 500 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a test program generating step 502, an embodiment generates at least one test program 304. Test programs may be generated by specifying a pattern 306 and then combining statements, transactions, variable reads, variable writes, and/or other test program constituents combinatorically. Combinations may be randomized, or made deterministically.

During a schedule formulating step 504, an embodiment formulates at least one execution schedule 318 for at least one test program 304. Schedules may be formulated by dividing assignment statements into constituent reads and writes and then interleaving the test program's read and write operations combinatorically. For example, one combination has all operations of a first thread executed before any operation of a second thread; another combination alternates between two threads until all operations of at least one thread have executed; other combinations interleave operations for execution in other ways. Combinations may be selected randomly, or they may be made deterministically.

During a legal final state(s) obtaining step 506, at least one legal final state for at least one shared variable 312 is obtained. Legal final states 204 may be obtained by executing schedules of a test program under a locking memory model implementation to generate the legal final states and/or by accessing a data 326 set containing previously generated legal final states.

During a candidate final state(s) producing step 508, at least one candidate final state for at least one shared variable 312 is produced. Candidate final states 204 may be obtained by executing schedules of a test program under a transactional memory implementation 120.

During a determining step 510, an embodiment determines whether a set of candidate final states is a subset of a set of legal final states, e.g., by comparing values to ascertain whether any of the candidate final states is illegal.

During a comparing step 512, an embodiment compares at least one candidate final state to at least one legal final state. Determining step 510 involves comparison of sets, whereas comparing step 512 involves comparison of individual values. Determining step 510 may be accomplished by multiple instances of comparing step 512.

During a locking memory model implementation executing step 514, an embodiment executes at least one schedule of at least one test program 304 under an implementation of a locking memory model 324.

During a comprehensive-test-program executing step 516, an embodiment executes at least one schedule for each test program 304 that conforms to a given pattern 306. Execution may be under a transactional memory implementation 120, under an implementation of a locking memory model 324, or with each schedule executed under both implementations, for example.

During a comprehensive-schedules executing step 518, an embodiment executes all possible schedules 318 for a given test program 304. Execution may be under a transactional memory implementation 120, under an implementation of a locking memory model 324, or with each schedule executed under both implementations, for example.

During a pattern specifying step 520, a developer specifies a test program pattern 306, e.g., by specifying the number of threads, the number of transactions, and so on.

During a testing step 522, a test program having one or more specific features 314 such as a data race, privatization, or publication is used to test a transactional memory implementation 120. Testing step 522 may include other steps such as formulating schedules, obtaining legal final states, producing candidate final states, and determining whether any candidate final states are illegal.

During a repeating step 524, one or more other steps of flowchart 500 are repeated. For example, steps may be repeated with different schedules 318, with different test programs 304, and/or with different implementations.

Some embodiments provide a method for testing a transactional memory implementation, which includes generating 502 a test program, formulating 504 schedules of the test program, obtaining 506 a set of legal final state(s) of at least one shared variable by executing schedules of the test program under a locking memory model implementation, producing 508 a set of candidate final state(s) of at least one shared variable by executing schedules of the test program under the transactional memory implementation being tested, and determining 510 whether the set of candidate final states is a subset of the set of legal final states of the shared variable(s).

In some embodiments, the test program is randomly generated 502 in conformance with a pattern 306. For example, one pattern specifies that the test program has four shared variables, and also has two threads which each have four statements. In some embodiments, the method formulates 504 schedules 318 in the form of interleavings 320 by using iterative context-bounding, as discussed for example in U.S. Patent Application Publication No. 2006/0130010.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as test programs 304, program patterns 306, schedules 318, and final states 204, 206, in the form of data 118 and instructions 116, read from a removable medium 114 and/or another source such as a network connection, to form a configured medium. The configured memory 112 is capable of causing a computer system to perform method steps for checking transactional memory implementation(s) 120 as disclosed herein. FIGS. 1 through 5 thus help illustrate configured storage media embodiments and method embodiments, as well as system and method embodiments. In particular, any of the method steps illustrated in FIG. 5, or otherwise taught herein, may be used to help configure a storage medium to form a configured medium embodiment.

Some embodiments provide a storage medium 114 configured with computer code 116, 118 for performing a method for testing a transactional memory implementation 120. The method includes obtaining 506 a set of legal final states 204 of at least one shared variable 312 of a multi-thread 308 test program 304 by executing schedules 318 of the test program under a locking memory model 324 implementation. The schedules 318 specify different interleavings 320 of read operations 322 and write operations 322 of test program threads 308. In some embodiments, the test program includes at least one of the following features 314: publication, privatization, a data race. In some embodiments, the method produces 508 a set of candidate final states 206 of at least one shared variable by executing schedules of the test program under the transactional memory implementation being tested. In some, the method determines 510 whether the set of candidate final states is legal, that is, whether it is a subset of the set of legal final states 204 of the shared variable(s). Legal final states 204 are obtained 506 as discussed herein by executing schedules of the test program under an implementation of at least one locking memory model 324.

In some embodiments, the method automatically generates 502 the multi-thread test program; in other embodiments, some or all of the test programs 304 are generated 502 manually by a developer or other user 104. Either way, the generating step 502 may generate, for example, a multi-thread test program 304 which has at least one transaction, and which has at least one shared variable that is accessed by at least two threads and that is accessed both inside a particular transaction and outside that particular transaction. The test program may be randomly generated in conformance with a pattern 306 as discussed herein.

The method performed by code configuring the medium may formulate schedules 318 of the test program using iterative context-bounding and/or other systematic state space exploration techniques.

ADDITIONAL EXAMPLES

Some embodiments provide a practical and systematic approach to testing transactional memory. By way of background, transactional memory implementations often describe their semantics in the form of a memory model. The memory model provides a high level view of how the transactional memory implementation accesses memory.

Consider for example a transactional memory implementation that follows an Asymmetric Lock Atomicity (ALA) memory model 324, which may be described as follows: For each shared variable that is read within a transaction, a read lock is acquired at the start of the transaction. For each shared variable that is written to within a transaction, a write lock is acquired just before the first write to that shared variable. Other memory models are used to describe transactional memory implementations, as discussed for example in references being submitted with this document. The ALA memory model is only an example, but understanding the ALA memory model and its use facilitates an understanding of how testing tools 136 can be implemented and used with other locking memory models 324.

To test whether a transactional memory implementation followed the ALA memory model, we ran test program schedules under an ALA implementation and under the transactional memory implementation being tested. Consider first the following simple test program, denoted here test program one:

```
        Initial state: A=0; B=1;
Thread 1:           Thread 2:
atomic {            atomic {
    A=B;                B=A;
}                   }
ASSERT(A == B)
ASSERT((A == 1) || (A == 0))
ASSERT((B == 1) || (B == 0))
```

Test program one consists of two threads and two shared variables, both of which are modified atomically. We used this program as a simple test for a transactional memory implementation. We determined whether the test was passed by adding post condition checks in the form of assert statements to make sure that the final states of the shared variables are what we expect under the ALA memory model. Notice that the final states depend on the specific schedule used in the execution and that the choice of schedule is non-deterministic. Therefore, to verify the results of this test program, we examined all possible outputs resulting from all possible schedules. By manual inspection of the program, we can assert that at the end of execution under every schedule, the values of A and B should be the same if the transactional memory implementation did indeed perform the assignment operations atomically. We further assumed that A and B will be either zero or one in all correctly executed schedules. As we split each of the statements in the program into its constituent atomic steps (for example, "A=B;" consists of "t=B;" and "A=t;"), test program one had six possible schedules 318, of which only two schedules honor the atomic blocks: t=B; A=t; t=A; B=t; (Thread 1->Thread 2) and t=A; B=t; t=B; A=t; (Thread 2->Thread 1).

Now consider test program two:

```
          Initial state: A=1; B=2; C=3; D=4;
Thread 1:           Thread 2:
atomic {            atomic {
    A=B;                B=A;
}                   }
atomic {            atomic {
    C=D;                D=C;
```

Test program two consists of two threads with two transactions each, with four shared variables, and with a total of seventy schedules to consider if we split each statement into its atomic steps. Note that a small increase in the number of individual steps in the program has resulted in a large increase in the number of ways in which the program can be scheduled.

More generally, for n concurrent threads, each with k atomic steps, the number of schedules S is $(nk)!/((k!)^n)$. From this, it is evident that the number of possible schedules for a program increases exponentially with the number of atomic steps executed by each thread. Therefore, manually writing and verifying test programs of the sort described above becomes intractable in many situations.

To summarize, we identified the following as some of the problems faced while testing transactional memory implementations: the number of possible schedules for a program increases very quickly with an increase in program size; the effective test coverage of a program is limited by the number of unique schedules that are run; manually writing a large number of programs to test a transactional memory implementation is both impractical and error prone; manual verification of the results becomes intractable as program size increases. Accordingly, some embodiments reduce or overcome the problem of having to manually explore all schedules of a test program by using a test tool that systematically explores the schedules of a given program. Some embodiments reduce or overcome the scalability problem by using simple test programs that have a manageable number of schedules. Some embodiments reduce or overcome the problem of having to manually write several test programs by implementing a test program generator that generates simple programs that satisfy the constraints we choose, namely, we ultimately generate test programs that match a pattern 306.

Some embodiments reduce or overcome the problem of having to manually verify the result set of all the schedules of a test program by using a test "oracle" approach to generate legal final states 204 allowing verification of test results in an automated fashion.

We considered various factors while designing a transactional memory testbed. Ideally, verifying the correctness of a transactional memory implementation would require running every possible schedule of every possible test program against the transactional memory system, and then verifying the correctness of each run. However, this approach does not scale very well as program size increases. Therefore, we created what we believe to be a pragmatic approach to solve the hard problem of testing transactional memory implementations, by using small test programs that have the following features: four shared Boolean variables labeled A, B, C and D; two threads that read and write the shared variables; and four statements labeled S1, S2, S3 and S4 in each thread, where a statement is one of the following operations: X=0, X=1, X=!X, X=Y and X=!Y. As an additional feature, each thread is of the form shown below in test program pattern one, where statements S2 and S3 are executed within a transaction:

```
S1;
atomic {
    S2;
    S3;
}
S4;
```

We believe that using four shared variables is sufficient to test for some well known transactional memory problems, as discussed herein. We also believe that using two threads is sufficient to test for the well known transactional memory problems, and increasing the number of contending threads beyond two exponentially increases the amount of time taken to do a systematic exploration of program schedules. X and Y can be any of A, B, C or D, and we assume that the statements can be divided into constituent atomic steps, as discussed herein.

With this structure, we are able to write programs that perform both racy and non-racy reads and writes to the shared variables. In this context, a racy program is one in which two threads concurrently access a shared variable such that at least one of these accesses is done outside a transaction. Conversely, a non-racy program is one in which no shared variable is accessed concurrently both inside and outside a transaction.

Before a test program is executed, the shared variables are given an initial value. After execution, the final values of the shared variables are noted. Every execution of the program results from a specific schedule 318, and every schedule yields a particular final state of the shared variables 312.

Some embodiments perform a systematic exploration of shared variable state space. Running a test program a small number may be insufficient because some concurrency bugs may not be exposed by running only a fraction of the possible schedules. In order to explore the schedules of a test program, we used the Chess program developed by Microsoft Research. The Chess program uses iterative context-bounding to generate schedules.

For a test program T that uses an implementation I to achieve atomicity, we define output O(T; I) as the set of final states of all schedules of test T under the implementation I. Based on this we define the following: O(T; TM) is the set of all final states 206 of a test program T implemented with transactional memory, and O(T; ALA) is the set of all final states 204 of a test program T implemented using reader-writer locks and following ALA semantics. A correctness criterion for the transactional memory implementation is then defined as O(T; TM)=O(T; ALA). In other words, the transactional memory implementation is expected to behave as if independent reader-writer locks were used while accessing each shared variable. For some of our testing, we used the ALA implementation as a test "oracle" to verify our transactional memory implementation based on this correctness criterion.

We also pursued a useful reduction of systematic exploration. Iterative context-bounding limits the number of scheduler choices without limiting the depth of the execution. From this, we introduced the variable C, an upper bound on the number of thread pre-emptions in a single program execution, thereby limiting the number of schedules. We thus have O(T; TM; C) as the set of all candidate final states 206 of a test program T implemented with some version of transactional memory, for all executions possible under a context-bound C, and O(T; ALA; C) as the set of all legal final states 204 of a test program T implemented using reader-writer locks and following ALA semantics as the locking memory model 324, for all executions possible under a context-bound C. Because the schedules explored through iterative context-bounding are dependent on the implementation being used, it is incorrect to assume that O(T; TM; C)=O(T; ALA; C) for an arbitrary value of C. The implementation of our test oracle is inherently simpler than that of our transactional memory implementation. We therefore expect the systematic exploration with a given value of C to cover a larger percentage of the state space of the test oracle implementation than that of the transactional memory implementation. Accordingly, we refined our correctness criterion to "O(T; TM; C) is a subset of O(T; ALA; C)".

To achieve desired coverage, we implemented a random generator of test programs that match pattern one discussed above. To promote useful coverage, we also generated tests that satisfy a property of non-triviality. A test program is said to be non-trivial if there is at least one shared variable that is transactionally accessed by at least two threads, and at least one thread writes to the variable. All test programs 304 we generated satisfy this criterion.

To summarize, we tested a transactional memory implementation with our testbed as follows. We used our test program generator 302 to generate a random test program. We explored the schedules of the program using the ALA memory model implementation, thereby generating the set of all legal final states 204 of the shared variables. We explored the schedules of the same program again, this time using the transactional memory implementation under test, and generated the set of all candidate final states 206 of the shared variables. We compared the sets of legal final states and candidate final states to verify the correctness of the transactional memory implementation for the test program, namely, to verify that the transactional memory implementation satisfied the atomicity, consistency, and isolation properties under the ALA memory model 324. We also repeated the foregoing steps for multiple test programs, thereby increasing test coverage.

We also investigated publication and privatization, two problems with transactional memory that have been discussed by researchers. Privatization safety is defined as the requirement that a transactional memory system must respect a happens-before ordering relation from a transactional access to a conflicting non-transactional access. We represented the privatization problem using test program four:

```
         Initial state: A=0; B=1; C=0; D=0;
Thread 1:            Thread 2:
atomic {             atomic {
     B=0;                 A=B;
}                         C=D;
D=1;                 }
O(T, ALA) = O(T, TM) = { <A=0,B=0,C=0,D=1>,
                         <A=0,B=0,C=1,D=1>,
                         <A=1,B=0,C=0,D=1> }
```

The statement "B=0;" in Thread 1 is the privatizing write that protects D. We want to ensure that if the transaction in Thread 2 observes that B==1, it also observes that D==0. Therefore, it follows that if A==1, then C==0.

Publication safety is the dual of privatization safety, and is defined as the requirement that a transactional memory system must respect a happens-before ordering relation from a non-transactional access to a conflicting transactional access. We represented the publication problem using test program five:

```
         Initial state: A=0; B=0; C=0; D=0;
Thread 1:            Thread 2:
D=1;
atomic {             atomic {
     A=B;                 B=1;
     C=D;            }
}
O(T, ALA) = O(T, TM) = { <A=0,B=1,C=0,D=1>,
                         <A=0,B=1,C=1,D=1>,
                         <A=1,B=1,C=1,D=1> }
```

The statement "B=1;" in Thread 2 is the publicizing write that publishes D. We want to ensure that if the transaction in Thread 1 observes that B==1, it also observes that D==1. Therefore, it follows that if A==1, then C==1.

When we ran test programs four and five against our transactional memory implementation 120, we saw the final states 206 shown above with test programs four and five, respectively, indicating that the transactional memory system was respecting privatization and publication safety. When we disabled mechanisms in the transactional memory implementation that were designed to mitigate the problems of privatization and publication and re-ran the same test programs, our test framework was able to find final states in O(T; TM; C) that did not exist in O(T; ALA; C) and were therefore invalid states, thus proving that our method of systematic exploration of simple test programs is capable of finding bugs that may otherwise be difficult to reproduce.

As an additional example, involving publication by anti-dependence, consider test program six:

```
         Initial state: A=0; B=1; C=0;
Thread 1:            Thread 2:
B=C;
atomic {C=A;         atomic {
     A=B;                 C=A;
}                    }
O(T, ALA) = O(T, TM) = { <A=0,B=0,C=0>,
                         <A=1,B=0,C=0>,
                         <A=1,B=0,C=1> }
```

Note that B is read by Thread 1 within a transaction and is concurrently written to by Thread 2. When run against our transactional memory system, the following schedules were of particular interest. First, if Thread 1 completely executes its transaction before Thread 2, we arrive at the final state A=1; B=0; C=1. Second, if Thread 2 completely executes its transaction before Thread 1, we arrive at the final state A=0; B=0; C=0. However, if the load operation in Thread 1's transaction was completed before Thread 2's transaction, and the store operation in Thread 1's transaction was completed after Thread 2's transaction, then we have the final state A=1; B=0; C=0, as shown in the following schedule:

```
          atomic {
     t=B;
                          B=C;
                          atomic {
                               C=A;
                          }
     A=t;
}
Final state: A=1; B=0; C=0;
```

From inspection, the final state shown with this schedule should be possible in a weakly atomic transactional memory implementation, but not in a strongly atomic transactional memory implementation. When we ran test program six on our transactional memory implementation, we were able to arrive at the above final state, thereby validating that our transactional memory implementation is weakly atomic. This transactional memory problem is referred to as "publication by anti-dependence".

The test framework described above allowed a significant number of test programs to be generated and systematically explored in a reasonable amount of time. Our test framework was able to systematically explore a test program (run on both our transactional memory system and on the ALA test oracle) in about one minute. We were therefore able to run approximately 1400 test programs on a machine in a 24 hour period. Each test program yielded approximately 5000 unique schedules when run on the test oracle, and approximately 20000 unique schedules when run on our transactional memory system. In addition, our random test generator 302 was able to arrive at test programs like example test programs four, five and six discussed above, within a few minutes of random generation, and therefore provided significant test coverage to the problems. We used a context-bound of three for the Chess program while running test programs against our transactional memory system and test oracle, because we found that all the known transactional memory problems could be found with no more than three pre-emptions. This allowed us to restrict the amount of time taken to explore each test program, while achieving the desired amount of test coverage.

Some embodiments provide a method for analyzing multithreaded software with bounded context switches. The method begins by generating 502 a random test program 304 that satisfies specific test criteria, specified in a pattern 306 or otherwise. All schedules 318 of the program are executed using an appropriate locking memory model 324 implementation (e.g., Single Global Lock Atomicity or Asymmetric Lock Atomicity), thereby obtaining 506 the set of all legal final states 204 of the shared variables 312. All schedules of the same program are also executed using the transactional memory implementation 120 under test, thereby producing the set of all candidate final states 206 of the shared variables. Comparing 512 the sets of final states 204, 206 allows one to verify the test implementation output against the correctness criterion. These steps may be repeated 524 for multiple test programs 304.

With regard to memory models, under Single Global Lock Atomicty (SGLA) code within a transaction is executed as if protected under a single global lock. For example: Atomic {S;}->lock (globalLock) {S;}. Under Asymmetric Lock Atomicity (ALA) code within a transaction is executed as if each access was protected under a reader/write lock; 'read locks' are acquired at the beginning on a transaction, and 'write locks' are acquired as encountered in program order.

One random generator 302 of test programs was restricted to a pattern specifying four shared Boolean variables, two threads that read/write these variables, four statements in each thread (S1, S2, S3 and S4), and this thread structure: S1; atomic {S2; S3;}S4;. Test programs 304 are most interesting if they have at least one shared variable that is transactionally accessed by both threads, such that at least one thread writes to the variable. Techniques used in the Chess program and discussed in the above-identified published patent application can be used to provide complete coverage of a test program's state space. The resulting set of unique final states can then be checked against a correctness criterion such as O(T, TM) ⊆ O(T, ALA).

As an example, consider the following test program alpha and its execution results:

| Test Program Alpha | |
|---|---|
| Initial state: A=0; B=1; C=0; D=0; | |
| Thread 1 | Thread 2 |
| Atomic { B=0; } D=1; | Atomic { A=B; C=D;} |
| Final state: | |
| O(T, TM) = { | O(T, ALA) = { |
| <A=0,B=0,C=0,D=1>, | <A=0,B=0,C=0,D=1>, |
| <A=0,B=0,C=1,D=1>, | <A=0,B=0,C=1,D=1>, |
| <A=1,B=0,C=0,D=1> | <A=1,B=0,C=0,D=1> |
| } | } |

As another example, consider test program beta:

| Test Program Beta | |
|---|---|
| Initial state: A=0; B=1; C=0; | |
| Thread 1: | Thread 2: |
| atomic { | Atomic { |
| A=B; | C=A; |
| } | } |

Executing test program beta yielded the following:

| Results | | |
|---|---|---|
| O(T, SGLA) = { | O(T, TM) = { | O(T, ALA) = { |
| <A=0,B=0,C=0>, | <A=0,B=0,C=0>, | <A=0,B=0,C=0>, |
| <A=1,B=0,C=1> | <A=1,B=0,C=0>, | <A=1,B=0,C=0>, |
| } | <A=1,B=0,C=1> | <A=1,B=0,C=1> |
| | } | } |

Some examples of schedules 318 for test program beta include:

| Possible Schedules (to yield the results above) |
|---|
| atomic { |
|   A=B; |
| } |
|                    B=C; |
|                    atomic { |
|                       C=A; |
|                    } |
|         Final State: A=1, B=0, C=1 |
|                    B=C; |
|                    atomic { |
|                       C=A; |
|                    } |
| atomic { |
|   A=B; |
| } |
|         Final State: A=0, B=0, C=0 |
| atomic { |
|   temp=B; |
|                    B=C; |
|                    Atomic { |
|                       C=A; |
|                    } |
| A=temp; |
| } |
| Final State: A=1, B=0, C=0 |

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIG. 5 also help describe configured media, and help describe the operation of systems and manufactures like those discussed in connection with FIGS. 2 through 4. It does not follow that limitations from one embodiment are necessarily read into another. In particular, methods are not necessarily limited to the data structures and arrangements presented while discussing systems or manufactures such as configured memories.

Not every item shown in the figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for testing a transactional memory implementation, comprising the steps of automatically:
   generating a test program which has at least two threads, has at least one transaction, and has at least one shared variable which is concurrently accessed by at least two threads and which is accessed both inside a particular transaction and outside that particular transaction;
   formulating schedules of the test program which specify different interleavings of read operations and write operations of the test program threads;
   obtaining a set of legal final state(s) of at least one shared variable by executing schedules of the test program under a locking memory model implementation;
   producing a set of candidate final state(s) of at least one shared variable by executing schedules of the test program under the transactional memory implementation being tested; and
   determining whether the set of candidate final states is a subset of the set of legal final states of the shared variable(s).

2. The method of claim 1, wherein the test program is randomly generated in conformance with a pattern which specifies at least one of the following:
   an acceptable range for the number of shared variables in the test program,
   an acceptable range for the number of threads in the test program,
   an acceptable range for the number of threads that read a shared variable in the test program,
   an acceptable range for the number of threads that write a shared variable in the test program,
   an acceptable range for the number of statements in a thread,
   an acceptable range for the number of transactions in a thread,
   an acceptable placement for a transaction in the test program.

3. The method of claim 1, wherein the test program has four shared variables, and also has two threads which each have four statements.

4. The method of claim 1, wherein the method formulates schedules of the test program using iterative context-bounding.

5. The method of claim 1, wherein the method executes schedules of the test program under an implementation of at least one of the following locking memory models: strongly atomic in-place update, single global lock atomicity, asymmetric flow ordering, asymmetric lock atomicity, disjoint lock atomicity, encounter-time lock atomicity.

6. The method of claim 1, wherein the method automatically: generates multiple test programs, formulates schedules for each test program, obtains legal final states using the schedules, produces candidate final states using the schedules, and determines whether any candidate final state is an illegal final state.

7. The method of claim 1, wherein the test program includes at least one of the following: publication, privatization.

8. A computer-readable storage device configured with data and instructions for performing a method for testing a transactional memory implementation, the method comprising the steps of:
   obtaining a set of legal final states of at least one shared variable of a multi-thread test program by executing schedules of the test program under a locking memory model implementation, the schedules specifying different interleavings of read operations and write operations of test program threads, the test program including at least one of the following: publication, privatization, a data race;
   producing a set of candidate final states of at least one shared variable by executing schedules of the test program under the transactional memory implementation being tested; and
   determining whether the set of candidate final states is a subset of the set of legal final states of the shared variable(s).

9. The configured medium of claim 8, wherein the method further comprises generating the multi-thread test program.

10. The configured medium of claim 9, wherein the generating step generates a multi-thread test program which has at least one transaction, and which has at least one shared variable that is accessed by at least two threads and that is accessed both inside a particular transaction and outside that particular transaction.

11. The configured medium of claim 9, wherein the test program is randomly generated in conformance with a pattern which specifies at least one of the following:
   an acceptable range for the number of shared variables in the test program,
   an acceptable range for the number of threads in the test program,
   an acceptable range for the number of threads that read a shared variable in the test program,
   an acceptable range for the number of threads that write a shared variable in the test program,
   an acceptable range for the number of statements in a thread,
   an acceptable range for the number of transactions in a thread,
   an acceptable placement for a transaction in the test program.

12. The configured medium of claim 8, wherein the method further comprises formulating schedules of the test program using iterative context-bounding.

13. The configured medium of claim 8, wherein the method executes schedules of the test program under an implementation of at least one of the following locking memory models: strongly atomic in-place update, single global lock atomicity, asymmetric flow ordering, asymmetric lock atomicity, disjoint lock atomicity, encounter-time lock atomicity.

14. A computer system comprising:
   a memory which contains transactional memory implementation test data generated by the following method:
      obtaining a set of shared variable legal final states by executing schedules of a test program under a locking memory model implementation, the test program having at least two threads, at least one transaction, and at least one shared variable which is accessed by at least two threads and which is accessed both inside a particular transaction and outside that particular transaction, the schedules specifying different interleavings of read operations and write operations of the test program threads;

producing a set of shared variable candidate final states by executing schedules of the test program under a transactional memory implementation; and repeating the obtaining step and the producing step for multiple test programs;

and a processor in operable communication with the memory to facilitate the method.

15. The system of claim 14, wherein the method further comprises automatically comparing the shared variable candidate final states to the shared variable legal final states.

16. The system of claim 14, wherein the method further comprises automatically generating the test programs in conformance with a pattern which specifies at least one of the following:

an acceptable range for the number of shared variables in the test program, an acceptable range for the number of threads in the test program, an acceptable range for the number of threads that read a shared variable in the test program, an acceptable range for the number of threads that write a shared variable in the test program, an acceptable range for the number of statements in a thread, an acceptable range for the number of transactions in a thread, an acceptable placement for a transaction in the test program.

17. The system of claim 16, wherein the method comprises at least one of the following: executing at least one schedule for each of the possible test programs that conform with a particular pattern; executing all possible schedules for at least one test program.

18. The system of claim 14, wherein the method further comprises automatically formulating schedules of the test program.

19. The system of claim 14, wherein the method executes schedules of the test program under an implementation of at least one of the following locking memory models: strongly atomic in-place update, single global lock atomicity, asymmetric flow ordering, asymmetric lock atomicity, disjoint lock atomicity, encounter-time lock atomicity.

20. The system of claim 14, wherein the test program includes at least one of the following: a data race, publication, privatization.

* * * * *